United States Patent [19]
Mills

[11] Patent Number: 5,782,323
[45] Date of Patent: Jul. 21, 1998

[54] CALIPER DISC BRAKE HAVING A LOW THERMAL CONDUCTIVITY EXTENSION ELEMENT

[76] Inventor: Rutledge A. Mills, 681 Chelham Way, Santa Barbara, Calif. 93108

[21] Appl. No.: 560,277

[22] Filed: Nov. 21, 1995

[51] Int. Cl.⁶ .................................................. F16D 55/26
[52] U.S. Cl. .................. 188/72.6; 188/72.9; 188/264 G
[58] Field of Search ................... 92/212, 248; 188/71.9, 188/72.6, 72.7, 72.9, 106 F, 344, 359, 360, 264 G, 24.12, 24.19, 24.21, 24.22

[56] References Cited

U.S. PATENT DOCUMENTS

| | | | |
|---|---|---|---|
| 1,930,272 | 10/1933 | Huck | 74/502.3 |
| 2,087,378 | 7/1937 | Goepfrich | 74/502.3 |
| 2,954,850 | 10/1960 | Cislo | 188/71 |
| 3,020,094 | 2/1962 | Murty et al. | 188/170 |
| 3,047,098 | 7/1962 | Olley | 188/73 |
| 3,103,990 | 9/1963 | Wilkinson | 188/73 |
| 3,109,517 | 11/1963 | Butler | 188/71.7 |
| 3,173,515 | 3/1965 | Haddock et al. | 188/217 |
| 3,255,848 | 6/1966 | Harrison | 188/72.6 |
| 3,407,907 | 10/1968 | Schmid | 188/72.6 |
| 3,587,788 | 6/1971 | Beach | 188/71.7 |
| 3,690,417 | 9/1972 | Airheart | 188/72.6 |
| 3,721,321 | 3/1973 | Yarber | 188/72.6 |
| 4,109,765 | 8/1978 | Johannesen | 188/72.9 |
| 4,136,759 | 1/1979 | Schoch | 188/24.12 |
| 4,194,596 | 3/1980 | Garret et al. | 188/72.7 |
| 4,393,962 | 7/1983 | Kobelt | 188/72.6 |
| 4,660,460 | 4/1987 | Fulmer | 92/168 |
| 4,896,753 | 1/1990 | Sule | 188/24.19 |
| 4,923,036 | 5/1990 | Margetts | 188/72.9 |
| 5,031,511 | 7/1991 | Villata | 92/128 |
| 5,582,273 | 12/1996 | Baumgartner et al. | 188/72.9 |

OTHER PUBLICATIONS

Motor Magazine. Jul. '95—Ford Truck Brake Insullator Kit.
Race Car Tech Profile , Jul.'95—Brake Cooling.
Parent Patent Research Report, Jan. '95.

*Primary Examiner*—Matthew C. Graham
*Assistant Examiner*—Chris Schwartz
*Attorney, Agent, or Firm*—W. D. English

[57] ABSTRACT

An apparatus which improves a conventional hydraulic brake system by locating the hydraulic brake fluid chamber sufficiently remote from the brake pads and their associated rotating brake element to prevent overheating of the brake liquid causing subsequent loss of hydraulic braking force. A communicating member is disposed between the hydraulic fluid chamber and the brake assembly which is comprised of a material possessing a low thermal conductivity.

5 Claims, 3 Drawing Sheets

CALIPER DISC BRAKE HAVING A LOW THERMAL CONDUCTIVITY EXTENSION ELEMENT

BACKGROUND OF THE INVENTION

1. Field of the Invention

This invention relates to a brake system of the type having calipers having friction pads with at least one of the calipers moveable into frictional engagement with a rotating disc or drum by a brake-applying hydraulic mechanism.

2. Description of the Prior Art

It is well known in the prior art that hydraulically operated friction brakes are required to absorb a relatively great amount of kinetic energy in the form of heat. Friction brakes conventionally have a pair of brake pads associated with each braking element. Usually, braking elements are either in the form of disc rotors or drums. In normal driving practice, the heat generated from frictional engagement of each braking element with its associated brake pads is not sufficient to elevate the temperature of the hydraulic brake liquid to its boiling point. There are, however, certain situations where the brake liquid could reach its boiling point. These instances would most notably occur where constant braking is required. An example would be where motor vehicles, especially heavy laden trucks, are traveling down a steep mountain road or highway. As is well known, a heavier vehicle traveling downhill will require more force to be applied to the braking elements than a lighter vehicle in order to reduce its velocity.

In braking situations, some of the heat generated will begin to transfer. If the braking period is for a sufficient length of time, heat will be transferred through the brake pad material, its associated calipers and piston, and eventually reach the hydraulic brake liquid. If sufficient heat reaches this liquid, it will begin to boil or, stated another way, the liquid will begin to undergo a partial phase change to a gas thereby altering the hydraulic brake non-compressible liquid system to a brake fluid system containing liquid and small bubbles of compressible gas. From an operational viewpoint, this situation will cause the brakes to become sluggish or, in the worst case, fail completely. It is also well known that when hydraulic liquid begins to boil and bubbles form, the efficiency of the hydraulic system diminishes significantly. Compressible gas appearing in a system only designed to handle incompressible liquid can be an undesired result of constant braking.

The prior art is abundant with improvements to the mechanical operation of the conventional hydraulic system. U.S. Pat. No. 3,109,517 issued to Butler et al., details an improvement to a conventional hydraulic braking system whereby as the brake pad thickness diminishes through repetitive frictional engagement with a rotating rotor, the distance between the brake pad surface and the rotating rotor will remain essentially constant thereby avoiding additional piston movement to frictionally engage the brake pads with the rotor as the brake pads wear. Butler et al. discloses a pilot chamber for accepting hydraulic fluid distally located from the rotating rotor and functions to adjust the position of the caliper arms for maintaining a set distance between the engagement surface of the brake pads and the rotor regardless of the brake pad wear. This pilot chamber is connected to a main cylinder in close proximity to the rotor. The purpose of the main cylinder is to furnish the necessary hydraulic force to the main piston for inducing brake pad frictional engagement with the rotor. Butler et al. does not disclose a concern for protecting the brake liquid from overheating and therefore, does not address the object of the present invention.

U.S. Pat. No. 3,407,907 issued to Schmid, discloses an auxiliary brake mechanism which incorporates the use of ball bearings. Schmid does not disclose the use of ball bearings as an assist in hydraulic braking nor does it disclose the use of ball bearings as a means to thermally insulate hydraulic braking fluid by remotely locating it from the brake pads and rotor.

U.S. Pat. No. 5,031,511 issued to Villata, discloses a hydraulic brake piston having an insulating core member to thermally insulate hydraulic braking fluid. Villata teaches an annular core member of heat insulating material such as brake friction liner material (i.e. fibers, fillers and binder). The annular core member is disposed within the body of a cylinder between the brake pad support surface and a slidable piston all of which are part of the brake housing assembly or stirrup. The insulating effectiveness of the core member is limited in thickness by the operational concerns of the slidable piston within the cylinder. Villata also teaches that the core member is composed of brake friction Liner material. Villata, although addressing the concerns of hydraulic fluid overheating, does not remove the hydraulic fluid to a location remote from the brake housing assembly which is necessary to provide additional protection from hydraulic liquid overheating.

OBJECTS OF THE INVENTION

It is an object of this invention to provide a hydraulic braking system which will insulate and protect the hydraulic brake liquid from the intense heat caused in friction braking systems. It is a further object to provide an assembly which is economical to manufacture, compatible with most vehicular design requirements and easy to incorporate into present hydraulic braking systems.

SUMMARY OF THE INVENTION

The hydraulic brake liquid is protected from overheating by locating it and the actuating piston at a sufficient distance away from the point of heat generation (i.e. the frictional engagement of the brake pad with the rotor) to permit adequate heat dissipation to occur before it is conducted to the hydraulic liquid. One embodiment of the invention has a semi-rigid or rigid element referred to as a pushrod disposed between the back of the brake caliper and the piston to serve this purpose.

The hydraulic fluid, being remotely located from the calipers will provide operators, especially those driving heavy motorized vehicles, traveling downhill with an added measure of security.

The length of the pushrod or, put another way, the distance between the calipers and the remote fluid chamber housing the hydraulic liquid, should be a function of the thermal conductivity of the material comprising the pushrod. If the pushrod has a low thermal conductivity, then its length can be less than if it had a higher value. As is well known, a material with a low thermal conductivity rate has a low heat transfer rate through that material therefore permitting more heat to be dissipated through other media such as, in this case, the air surrounding the calipers and pushrod.

The pushrod can be made out of any rigid or substantially rigid material capable of existing in a high temperature environment which can withstand the compressive forces associated with braking without deformation. It is preferred that the pushrod, as discussed above, be made from a material which has a lower thermal conductivity value than that of steel. It is most preferred that the pushrod be constructed of steel for strength and reliability; however, a high strength composite such as a carbon fiber composite would offer superior insulation capability.

Even though the desired length of the pushrod is a function of its thermal conductivity, there still must be addressed the problem of design compatibility with each vehicle type. A pushrod extending away from the inside brake caliper and parallel to the ground may not have adequate space to be installed properly. This can occur because of the positioning of the engine block, transmission, suspension or other vehicular parts relative to the braking calipers or shoes and the direction which the pushrod would extend from the brake contact components. A second embodiment of the invention addresses this concern by coupling a pivot hinge between the pushrod and the caliper. The hinge therefore, would not require the pushrod to be perpendicular with the back end of the caliper. The pushrod could be located at various angles relative to the back end of the caliper housing thus permitting more adaptability than the first embodiment.

A third embodiment of the invention has a tube member extending from the brake housing assembly to the piston. Disposed within the tube member are compression resistant ball bearings which are capable of communicating the hydraulic force to the brake pad. The wall integrity of the tube member must be capable of withstanding the communicating force which each ball bearing imparts during braking. Further, the wall integrity must resist pinching which would reduce the inside diameter and block free movement of the ball bearings disposed within. The inside wall diameter is also configured to permit only one string of ball bearings so that bridging within the tube member will not occur. The significant advantage to this embodiment is that the tube configuration permits even closer adaptability with present automotive design than either of the first two embodiments.

Other features and advantages of the invention will become apparent to those skilled in the art upon review of the following detailed description and claims.

DETAILED DESCRIPTION OF A PREFERRED EMBODIMENT

Figure 1:
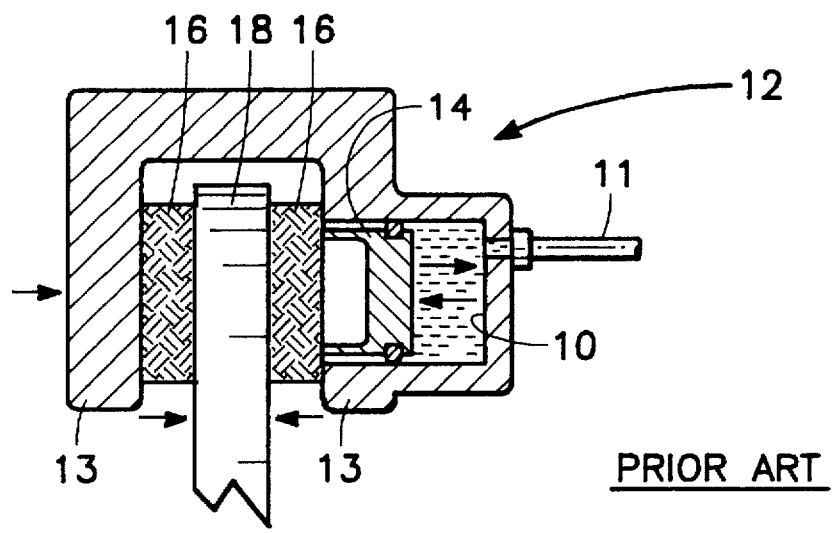
FIG. 1 is a schematic view of a conventional hydraulic rotor braking system.

FIG. 1 illustrates the present conventional design for a vehicular hydraulic brake assembly. In the conventional hydraulic brake system, a hydraulic fluid chamber 10 having a slidable piston 14 therein is connected directly to brake housing assembly 12 having single piston, floating caliper arms 13 and brake pads 16. Braking element 18 constitutes part of the wheel of the vehicle (not shown), although the brake element can of course be separate from the wheel. As a braking force is applied in the cab of the vehicle (not shown), brake fluid enters chamber 10 via fluid inlet tube 11 under pressure and hydraulically acts on the surface area of piston 14 causing displacement of floating caliper arms 13 thereby forcing brake pads 16 into frictional engagement with rotating rotor 18. It will be understood that the same braking principal would apply in a multi piston non floating caliper arm environment as well where the invention would be applied to each piston/cylinder unit.

Figure 2:
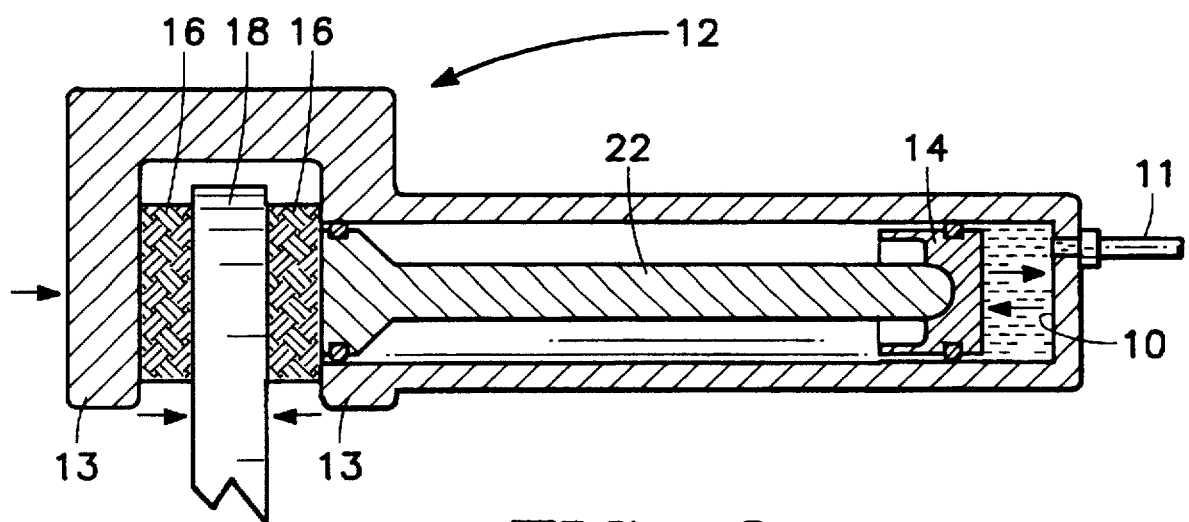
FIG. 2 is a schematic view of the preferred embodiment of the invention.
Figure 3:
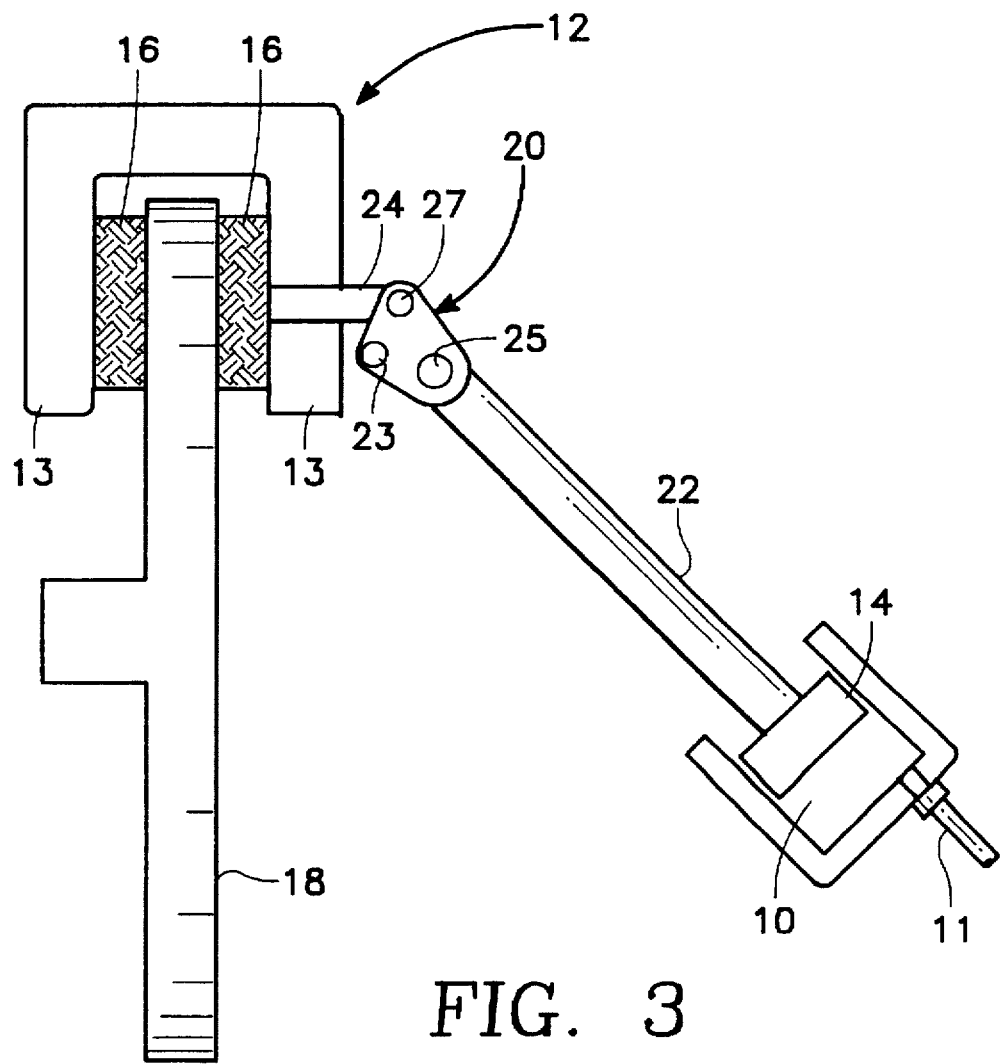
FIG. 3 is a schematic view of an alternative embodiment of the improved braking system.
Figure 4:
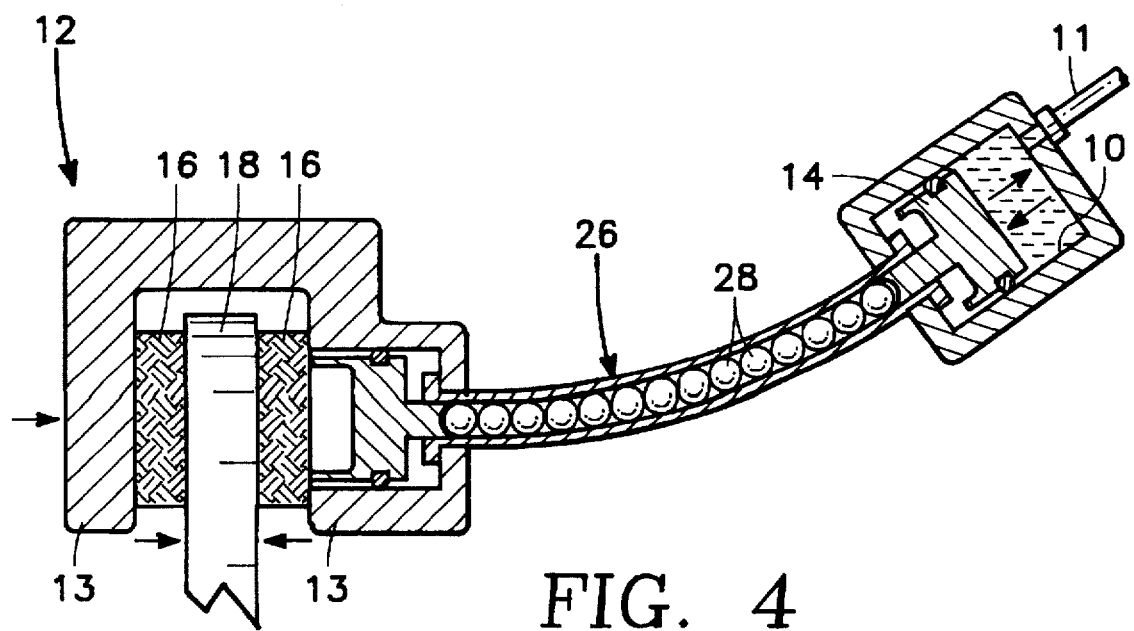
FIG. 4 is a schematic view of a second alternative embodiment of the improved braking system.

In FIGS. 2, 3 and 4, three embodiments of the invention are presented. In each, the hydraulic fluid chamber 10 and associated piston 14 are distally located from the brake housing assembly 12. In each embodiment, a communicating means is disposed between chamber 10 and assembly 12. The communicating means described in the following embodiments preferably consist of a material possessing a low thermal conductivity rate. Additionally, it is also preferred that piston 14 consist of the same material as that of the communicating means.

FIG. 2 shows one embodiment of the present invention. A low heat conduction pushrod 22 is disposed between the caliper brake assembly 12 and the remote hydraulic fluid chamber 10 and piston 14. When braking, the hydraulic fluid imparts a pushing force to the fluid contacting side of piston 14 which thereupon communicates the pushing force to the backside of brake assembly 12 through pushrod 22. The pushing force acts upon brake assembly 12 to urge brake pads 16 into frictional engagement with rotor 18. Brake pads 16 engage rotor 18 in the typical floating caliper fashion which is well known in the prior art. The subsequent heat generated by the friction between brake pads 16 and rotor 18 is sufficiently remote from fluid chamber 10 that the friction induced heat will not cause the hydraulic brake liquid to boil, even in sustained braking conditions.

FIG. 3 is a second embodiment of the present invention which utilizes a hinge 20 pivotally coupled to brake housing assembly 12 at a fulcrum pin 23 and to both pushrod 22 by a second pivotal pin 25 and to a second rod 24 by a third pivotal pin 27 which enables the pushing force to be communicated to brake housing assembly 12. When braking, pushrod 22 is used, in cooperation with hinge 20 and second rod 24 to communicate the pushing force to caliper 13.

FIG. 4 shows a third embodiment of the invention. Instead of the communicating push means comprising a push rod, the means comprises a tube 26 with a plurality of ball bearings 28 disposed therein. As in the other two variations, a hydraulic pushing force is applied to one end of a ball bearing string which communicates the pushing force to the back side of caliper 13 thereby urging brake pads 16 into frictional engagement with rotor 18. The inside diameter of the tube is sufficient to only permit the ball bearings to be positioned in a single string abutting relationship. Further, the wall integrity of the tube is capable of resisting deformation as a result of the pushing force communicated by the ball bearings.

Figure 5:
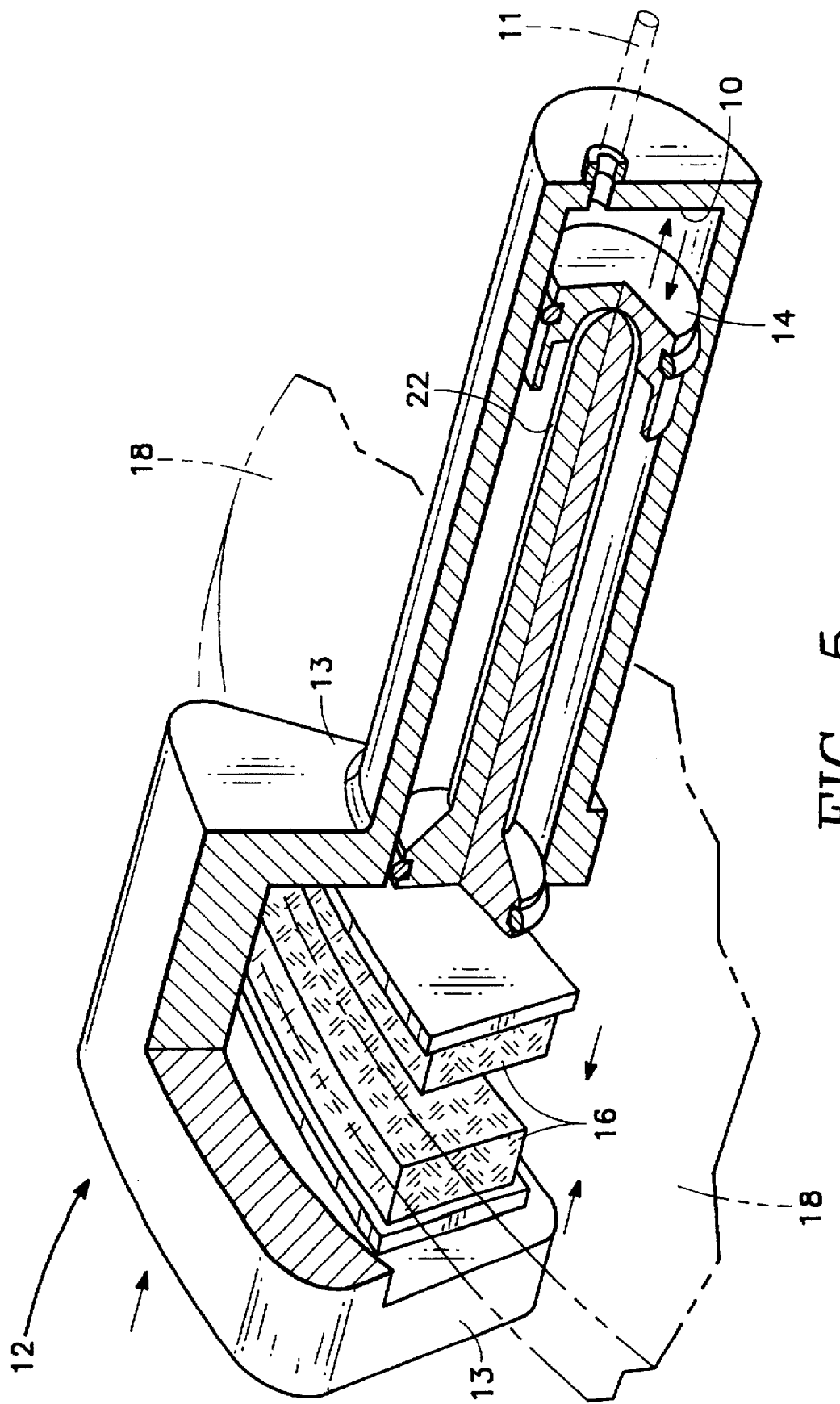
FIG. 5 is an exploded view of the improved braking system and its associated caliper housing.

Another embodiment is illustrated in FIG. 5, where pushrod 22 would be disposed within a modified and protective caliper housing 30 incorporating a pushrod housing 32 to prevent dirt and other matter from effecting the operational function of pushrod 22 or calipers 13. The modified housing would also serve to protect pushrod 22 from accidental bending or deformation.

FIG. 5 also presents an embodiment wherein caliper housing 30, pushrod housing 32, pushrod 22, piston 14 and chamber 10 are combined to form an integral assembly. Such an assembly can be economically manufactured.

What is claimed is:

1. A hydraulic brake system, comprising:

a brake structure including a pair of brake pads for frictionally engaging a rotating brake element;

a chamber located remotely to said brake structure, said chamber having a slidable piston disposed therein whereby a hydraulic fluid is communicated to a first side of said piston by a fluid inlet connected to said chamber, said piston being slidable from a first position to a second position in response to said fluid entering said chamber through said fluid inlet and said piston displacement toward said second position defining a pushing force; and a connecting means disposed between said structure and a second side of said piston opposite said first side, said connecting means being capable of communicating said pushing force to said brake pads for urging said brake pads into frictional engagement with said rotating brake element, whereby said connecting means is of sufficient length to prevent heat caused by frictional engagement of said brake pads from reaching said chambers wherein said connecting means consists of a material having a low rate of thermal conductivity, whereby a low rate of thermal conductivity in combination with the sufficient length of said connecting means maximizes heat dissipation and prevents vaporization of said hydraulic fluid.

2. A hydraulic brake system, comprising:

a braking structure including at least one brake pad forcibly engagable with a rotating brake element;

a hydraulic means disposed remotely to said brake pad for applying a pushing force;

a communicating means disposed between said hydraulic means and said brake structure for locating said hydraulic means sufficiently remote to said brake structure and for communicating said pushing force to said brake structure to permit frictional engagement of said brake pad with said rotating brake element, said communicating means having a low rate of thermal conductivity to prevent a fluid of said hydraulic means from overheating and changing from an incompressible fluid to a compressible fluid during a period of continued and constant braking when large amounts of non dissipated heat energy are developed.

3. A hydraulic brake system, as recited in claim 2, wherein said communicating means comprises a substantially rigid pushrod, said physical characteristics of said pushrod including sufficient length and possessing a low thermal conductivity such that said fluid will not partially change into a compressible fluid due to the excessive heat generated by said frictional engagement of said brake pad with said rotating brake element.

4. In a conventional hydraulic brake system utilizing a noncompressible hydraulic fluid and having at least a pair of brake pads, wherein a first of said brake pads is removably connected to a caliper arm and a second of said brake pads is removably connected to a means for communicating an engaging force due to a hydraulic pushing means, where at least one of said brake pads is movable to frictionally contact a rotating brake element, the improvement comprising:

said communicating means being of sufficient length and of low thermal conductivity to allow said hydraulic pushing means to be remotely located from said brake pads and to sufficiently allow heat generated from said brake pads to adequately dissipate so as to prevent hydraulic fluid from overheating and eventually becoming compressible under braking conditions, said hydraulic pushing means effectuating a force on said communicating means to thereby cause said brake pads to move into frictional engagement with said rotating brake element.

5. A hydraulic brake system, as recited in claim 4, wherein said communicating means comprises a substantially rigid pushrod of sufficient length and having a thermal conductivity such that said hydraulic fluid will not change into a compressible fluid due to excessive heat generated by frictional engagement of said brake pads with said rotating element.

* * * * *